(12) United States Patent
Geng et al.

(10) Patent No.: US 10,847,008 B2
(45) Date of Patent: Nov. 24, 2020

(54) MONITORING SYSTEM AND METHOD

(71) Applicant: BOE TECHNOLOGY GROUP CO., LTD., Beijing (CN)

(72) Inventors: Lihua Geng, Beijing (CN); Masakazu Okamura, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 185 days.

(21) Appl. No.: 15/525,790

(22) PCT Filed: Jul. 7, 2016

(86) PCT No.: PCT/CN2016/089071
§ 371 (c)(1),
(2) Date: May 10, 2017

(87) PCT Pub. No.: WO2017/148061
PCT Pub. Date: Sep. 8, 2017

(65) Prior Publication Data
US 2018/0075725 A1    Mar. 15, 2018

(30) Foreign Application Priority Data

Mar. 4, 2016  (CN) .......................... 2016 1 0124479

(51) Int. Cl.
*G08B 21/04* (2006.01)
*G08B 21/18* (2006.01)
*H04N 5/33* (2006.01)

(52) U.S. Cl.
CPC ....... *G08B 21/0476* (2013.01); *G08B 21/043* (2013.01); *G08B 21/0423* (2013.01); *G08B 21/182* (2013.01); *H04N 5/33* (2013.01)

(58) Field of Classification Search
CPC ...... G08B 25/008; G08B 25/10; G08B 25/14; G08B 17/10; G08B 21/0423;
(Continued)

(56) References Cited

U.S. PATENT DOCUMENTS 5,617,855 A    4/1997  Waletzky et al.
2008/0256445 A1*  10/2008  Olch ....................... G06F 19/00
                                                            715/700
(Continued)

FOREIGN PATENT DOCUMENTS

CN    201228506    4/2009
CN    201583286    9/2010
(Continued)

OTHER PUBLICATIONS

International Search Report from corresponding PCT Application No. PCT/CN2016/089071 dated Dec. 1, 2016 (5 pages).
(Continued)

*Primary Examiner* — Farhan Mahmud
(74) *Attorney, Agent, or Firm* — Dave Law Group LLC; Raj S. Dave

(57) ABSTRACT

Exemplary embodiments of the present disclosure provide a monitoring system and method, the system comprising at least one pair of first sensing devices disposed on an outside and inside of a bathroom door, an information acquisition module, a central control module, and an alarm module, wherein the information acquisition module controls the first sensing devices to acquire first data and transmits the acquired first data to the central control module, the central control module determines whether to generate a first alarm signal and/or second alarm signal based on the acquired first data, and transmits the generated first alarm signal and/or a second alarm signal to the alarm module. Thus, the system can be informed timely of the health status of an old person living alone according to the use situation of the bathroom, and also the privacy of the old person can be protected effectively.

20 Claims, 2 Drawing Sheets

(58) Field of Classification Search
CPC ... G08B 29/185; G08B 21/0453; G06F 19/00; G06F 19/3418; G05B 15/02; G05B 2219/2642; H04L 12/2803; H04L 67/12; H04L 12/282; A61B 5/0022; F24F 11/30; H04N 7/183
See application file for complete search history.

(56) References Cited

U.S. PATENT DOCUMENTS

2010/0288468 A1    11/2010  Patel et al.
2013/0182107 A1*    7/2013  Anderson .............. G08B 21/02
                                                    348/143
2014/0111329 A1     4/2014  Tearston

FOREIGN PATENT DOCUMENTS

| CN | 101854385 | 10/2010 |
| CN | 102122422 | 7/2011 |
| CN | 102447459 | 5/2012 |
| CN | 102646320 | 8/2012 |
| CN | 104083161 | 10/2014 |
| CN | 104217511 | 12/2014 |
| CN | 204155408 | 2/2015 |
| CN | 204215533 | 3/2015 |
| CN | 105608838 | 5/2016 |
| CN | 205451392 | 8/2016 |

OTHER PUBLICATIONS

Written Opinion from corresponding PCT Application No. PCT/CN2016/089071 dated Dec. 1, 2016 (5 pages).
Office Action from corresponding Chinese Application No. 201610124479.9, dated Aug. 14, 2017 (12 pages).

* cited by examiner

MONITORING SYSTEM AND METHOD

TECHNICAL FIELD

Exemplary embodiments of the present disclosure relate to the field of monitoring and provide a monitoring system and method.

BACKGROUND

This section is intended to inform the reader of the techniques of various aspects of the art that may be relevant to the various aspects of the application, and it is believed that this section will help to provide background information to the reader in order to better understand the various aspects of the application. It should be understood, therefore, that this should be interpreted from this perspective, rather than as a recognition of the prior art.

Today, old people living alone have become a common phenomenon, and because of living alone, old people having sudden illness or falling and so on are difficult to be found, resulting in treatment delays or direct deaths. Now monitoring systems and methods are mostly using video surveillance, in which the family needs to observe the video information from time to time, and cannot provide a good protection for the privacy of the old person.

Because the bathroom is where the home must go and often go, and the bathroom is also a location where an old person easily falls ill or falls, it is necessary to monitor the use of the bathroom, so as to provide a monitoring system and method that can determine the health status of an old person.

SUMMARY

In order to overcome the shortcomings of the prior art, embodiments of the present disclosure provide a monitoring system and a monitoring method which mainly monitors the use of a bathroom to determine the health status of an old person living alone and can well protect the old person's privacy.

According to an aspect of the present disclosure, there is provided a monitoring system, comprising at least one pair of first sensing devices configurable to be disposed on an outside and inside of a room door, an information acquisition module, a control module, and an alarm module, wherein the information acquisition module is configured to control the first sensing devices to acquire first data and to transmit the acquired first data to the control module, the control module is configured to determine whether to generate a first alarm signal and/or second alarm signal based on the acquired first data, and to transmit the generated first alarm signal and/or second alarm signal to the alarm module.

According to an exemplary embodiment of the present disclosure, the control module configured to determine whether to generate a first alarm signal based on the acquired first data is configured to: generate the first alarm signal when the first sensing devices disposed on the outside and inside of the room door are not consecutively triggered for a time greater than or equal to a first threshold; otherwise, not generate the first alarm signal.

According to an exemplary embodiment of the present disclosure, the control module configured to determine whether to generate a second alarm signal based on the acquired first data is configured to: generate the second alarm signal when the first sensing devices disposed on the inside and outside of the room door are not consecutively triggered for a time greater than or equal to a second threshold after the first sensing devices disposed on the outside and inside of the room door were consecutively triggered in a time less than the first threshold.

According to an exemplary embodiment of the present disclosure, the system further comprises a second sensing device, wherein information acquisition module is configured to controls the second sensing device to acquire second data and to transmit the acquired second data to the control module, and the control module is further configured to determine whether to generate the second alarm signal based on the acquired second data and to transmit the generated second alarm signal to the alarm module, wherein the control module further configured to determine whether to generate a second alarm signal based on the acquired second data is configured to: generate the second alarm signal when the first sensing devices disposed on the inside and outside of the room door are not consecutively triggered for a time greater than or equal to a third threshold after the first sensing devices disposed on the outside and the inside of the room door were consecutively triggered in a time less than the first threshold and the second sensing device was triggered.

According to an exemplary embodiment of the present disclosure, the system further comprises a third sensing device, wherein the information acquisition module is configured to control the third sensing device to acquire third data and to transmit the acquired third data to the control module, and the control module is further configured to determine whether to generate a third alarm signal based on the acquired third data and to transmit the generated third alarm signal to the alarm module.

According to an exemplary embodiment of the present disclosure, the first sensing devices are infrared sensors.

According to an exemplary embodiment of the present disclosure, the second sensing device is a key switch to be triggered by a flush button of a toilet.

According to an exemplary embodiment of the present disclosure, the third sensing device is at least one pressure sensor disposed on a bathroom floor and scattered around a toilet.

According to an exemplary embodiment of the present disclosure, the system further comprises an image processing module and an image capturing device, wherein the image processing module is configured to turn on the image capturing device and to transmit an image acquired by the image capturing device according to at least one of the first alarm signal, the second alarm signal and the third alarm signal received from the control module.

According to an exemplary embodiment of the present disclosure, the alarm module is configured to transmit at least one of first alarm information, second alarm information, and third alarm information corresponding to the first alarm signal, the second alarm signal, and the third alarm signal respectively.

According to an exemplary embodiment of the present disclosure, the system further comprises at least one pair of fourth sensing devices configurable to be disposed on an outside and inside of a home door, wherein the information acquisition module determines whether or not to control the first sensing device, the second sensing device, and the third sensing device for data acquisition based on fourth data acquired by the fourth sensing devices.

According to an exemplary embodiment of the present disclosure, the information acquisition module configured to determine whether or not to control the first sensing device, the second sensing device, and the third sensing device for data acquisition based on fourth data acquired by the fourth sensing devices is configured to: turn on the first sensing device, the second sensing device, and the third sensing device when the fourth sensing devices disposed on the outside and inside of the home door are consecutively triggered; and turn off the first sensing device, the second sensing device, and the third sensing device when the fourth sensing devices disposed on the inside and outside of the home door are consecutively triggered.

According to an exemplary embodiment of the present disclosure, the room door is a bathroom door.

According to another aspect of the present disclosure, there is provided a monitoring method, comprising: generating a first alarm signal when first sensing devices disposed on an outside and inside of a room door are not consecutively triggered for a time greater than or equal to a first threshold; otherwise, not generating the first alarm signal.

According to an exemplary embodiment of the present disclosure, the method further comprises: generating a second alarm signal when the first sensing devices disposed on the inside and outside of the room door are not consecutively triggered for a time greater than or equal to a second threshold after the first sensing devices disposed on the outside and inside of the room door were consecutively triggered in a time less than the first threshold.

According to an exemplary embodiment of the present disclosure, the method further comprises: generating a second alarm signal when the first sensing devices disposed on the inside and outside of the room door are not consecutively triggered for a time greater than or equal to a third threshold after the first sensing devices disposed on the outside and inside of the room door were consecutively triggered in a time less than the first threshold and a second sensing device was triggered.

According to an exemplary embodiment of the present disclosure, the method further comprises: generating a third alarm signal when a third sensing device is triggered, wherein the third sensing device is at least one pressure sensor disposed on a bathroom floor and scattered around a toilet.

According to an exemplary embodiment of the present disclosure, the second sensing device is a key switch to be triggered by a flush button of a toilet.

According to an exemplary embodiment of the present disclosure, the method further comprises: turning on the first sensing device, the second sensing device, and the third sensing device when fourth sensing devices disposed on an outside and inside of a home door are consecutively triggered; and turning off the first sensing device, the second sensing device, and the third sensing device when fourth sensing devices disposed on an inside and outside of a home door are consecutively triggered.

According to an exemplary embodiment of the present disclosure, when at least one of the first alarm signal, the second alarm signal, and the third alarm signal is generated, an image capturing device is turned on and an acquired image is transmitted.

BRIEF DESCRIPTION OF THE DRAWINGS

In order to more clearly illustrate the technical solution of embodiments of the present disclosure, drawings of embodiments will be briefly described below. It will be apparent that the drawings in the following description are merely illustrative of some embodiments of the disclosure and are not intended to limit the disclosure.

DETAILED DESCRIPTION OF SPECIFIC EMBODIMENTS

Figure 1:
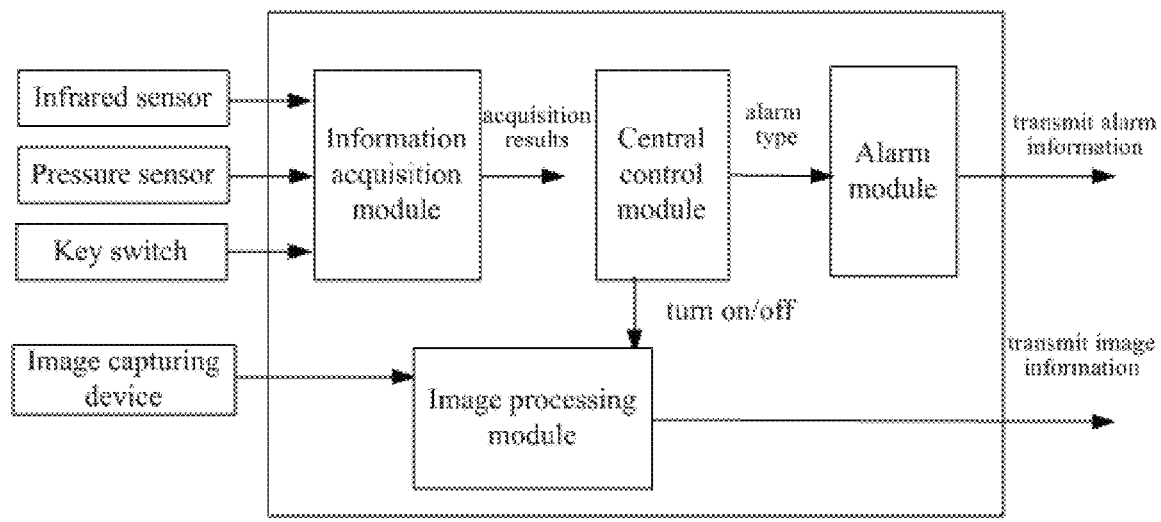
FIG. 1 is a block diagram of the structure of a monitoring system according to an exemplary embodiment of the present disclosure.

The objects, solutions and advantages of embodiments of the present disclosure will become more apparent from the following description of embodiments of the present disclosure when taken in conjunction with the accompanying drawings in which the embodiments described are merely some embodiments of the present disclosure, and not all embodiments. All other embodiments obtained by those of ordinary skill in the art based on the embodiments of the disclosure without making creative work are within the scope of the present disclosure.

In the description of the present disclosure, it is to be noted that the orientation or positional relationships indicated by the terms "upper", "lower", "top", "bottom" and the like are based on the orientation or positional relationships shown in the drawings, and are merely for the purpose of describing the disclosure and the simplifying the description, rather than indicating or implied that the means or elements referred to must have a particular orientation or be constructed and operated in a particular orientation, and are therefore not to be construed as limiting the disclosure.

In addition, in the description of the present disclosure, unless otherwise indicated, the meaning of "a plurality of" is two or more.

Hereinafter, a monitoring system and a method according to exemplary embodiments of the present disclosure will be described in detail with reference to FIGS. 1-3.

FIG. 1 is a block diagram of a monitoring system according to an exemplary embodiment of the present disclosure.

As shown in FIG. 1, a monitoring system according to an exemplary embodiment of the present disclosure includes at least a sensor group, an information acquisition module, a central control module, and an alarm module, wherein the sensor group includes at least one of an infrared sensor, a pressure sensor, and a key switch, the data acquisition module controls the sensor group to perform data acquisition or receives data from the sensor group and transmits the acquired data to the central control module, the control module generates a corresponding alarm signal based on the acquired data and transmits the generated alarm signal to the alarm module, the alarm module generates corresponding alarm information according to the alarm signal, and transmits the generated alarm information to a mobile phone or computer of the family, or transmits the alarm information to a specific monitoring center, or uploads it to a network side. Thus, according to an exemplary embodiment of the present disclosure, different alarm signals can be generated according to the triggering of the sensors to facilitate accurate and timely monitoring of the person being monitored.

In an exemplary embodiment, the monitoring system further comprises an image processing module and an image capturing device, the image processing module turns on the image capturing device according to at least one of the first alarm signal, the second alarm signal, and the third alarm signal received from the central control module, and transmits an image acquired by the image capturing device to a mobile phone or a computer of the family or a specific monitoring center, or uploads it to a network side. Therefore, according to an exemplary embodiment of the present disclosure, the image capturing device is turned on only when an alarm signal is generated, and thus the privacy of the person being monitored can be effectively protected.

It is to be noted that the embodiment given in FIG. 1 is for an illustrative purpose only and is not intended to limit the disclosure. Although only several specific sensing devices such as the infrared sensor, the pressure sensor, and the push switch are shown in FIG. 1, it will be understood by those skilled in the art that other types of sensing devices that can perform data acquisition or can be triggered can also be used in the present disclosure. Although the monitoring system in FIG. 1 is divided into specific devices/modules, in some exemplary embodiments, these modules/devices may also be combined or further divided, or even in some exemplary embodiments, some modules/devices can also be omitted.

Figure 2:
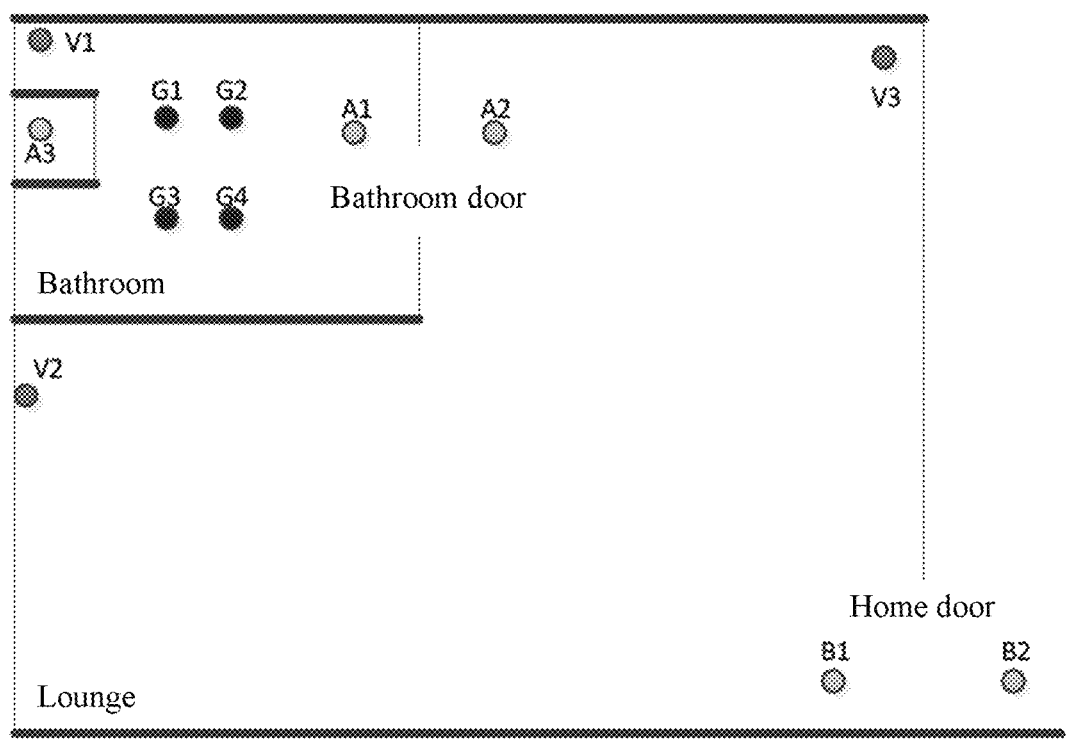
FIG. 2 is a schematic diagram of an arrangement of sensing devices in a monitoring system according to an exemplary embodiment of the present disclosure.

FIG. 2 is a schematic diagram of an arrangement of sensing devices in a monitoring system according to an exemplary embodiment of the present disclosure.

As shown in FIG. 2, the sensor group includes an infrared sensor A2 disposed outside the bathroom door, an infrared sensor A1 disposed inside the bathroom door, an infrared sensor B2 disposed outside the home door, an infrared sensor B1 disposed inside the home door, pressure sensors G1-G4 around the toilet, and a key switch A3 which can be triggered by a flush button of the toilet. The image capturing devices include cameras V1-V3 mounted in a bathroom, a living room or a room corner. Specifically, when a person is active in the vicinity, the infrared sensors A1, A2, B1 and B2 are triggered; when the flush toilet flushes, the key switch A3 is triggered; when a person falls or lies on the pressure sensors, the pressure sensors G1 to G4 are triggered; the cameras V1-V3 are turned on under the control of the image processing module. In some exemplary embodiments, the positions and number of the sensors described above may be adjusted, and the types of the sensors may also be adjusted or changed, for example by replacing the infrared sensor with a pressure sensor, or replacing the pressure sensor with an infrared sensor, which will not be described in detail here.

Through the monitoring of the sensors, the corresponding activity information of a person may be obtained according to Table 1.

TABLE 1

Correspondence Relationship between Triggering of the Triggers and Activity Information

| Personnel Activity Type | Triggering of Sensors or Switches |
| --- | --- |
| Enter the bathroom | A2, A1 are triggered consecutively |
| Exit the bathroom | A1, A2 are triggered consecutively |
| Flush | A3 is triggered |
| Faint to the ground | G1, G2, G3 or G4 is triggered |
| Exit through the home door | B1, B2 are triggered consecutively |
| Enter through the home door | B2, B1 are trigger consecutively |

It is to be noted that the consecutive triggering is in a specific triggering order. As shown in Table 1, when entering the bathroom, A2, A1 are triggered consecutively; when exiting the bathroom, A1, A2 are triggered consecutively; when exiting out of the home door, B1, B2 are triggered consecutively; and when entering the home door, B2, B1 are triggered consecutively.

Based on the above activity information, the monitoring system can generate different alarm signals, and the correspondence relationship between the alarm signal and the activity information is shown in Table 2.

TABLE 2

Correspondence Relationship between Alarm Signals and Activity Information

| Alarm signal | Activity information |
| --- | --- |
| First alarm signal (that is, alarming of the bathroom being not used for a long time) | The time for which the bathroom is not entered (that is, the time for which the infrared sensors A2 and A1 disposed on the outside and inside of the bathroom door are not consecutively triggered) is greater than or equal to a first threshold |
| Second alarm signal (that is, alarming of entering the bathroom, but not exiting it) | The time for which the bathroom is not exited after the bathroom was entered (that is, after the infrared sensors A2 and A1 disposed on the outside and inside of the bathroom door were consecutively triggered in a time less than the first threshold, the time for which the infrared sensors A1 and A2 disposed on the inside and outside of the bathroom door are not consecutively triggered) is greater than or equal to a second threshold; or when the bathroom was entered and toilet was flushed, the time for which the bathroom is not exited (that is, after the infrared sensors A2 and A1 were consecutively triggered within a time less than the first threshold and the key switch A3 was triggered, the time for which the infrared switches A1 and A2 disposed on the inside and outside of the bathroom door are not consecutively triggered) is greater than or equal to a third threshold |
| Third alarm signal (That is, alarming of fainting in the bathroom) | Faints to the ground |

Figure 3:
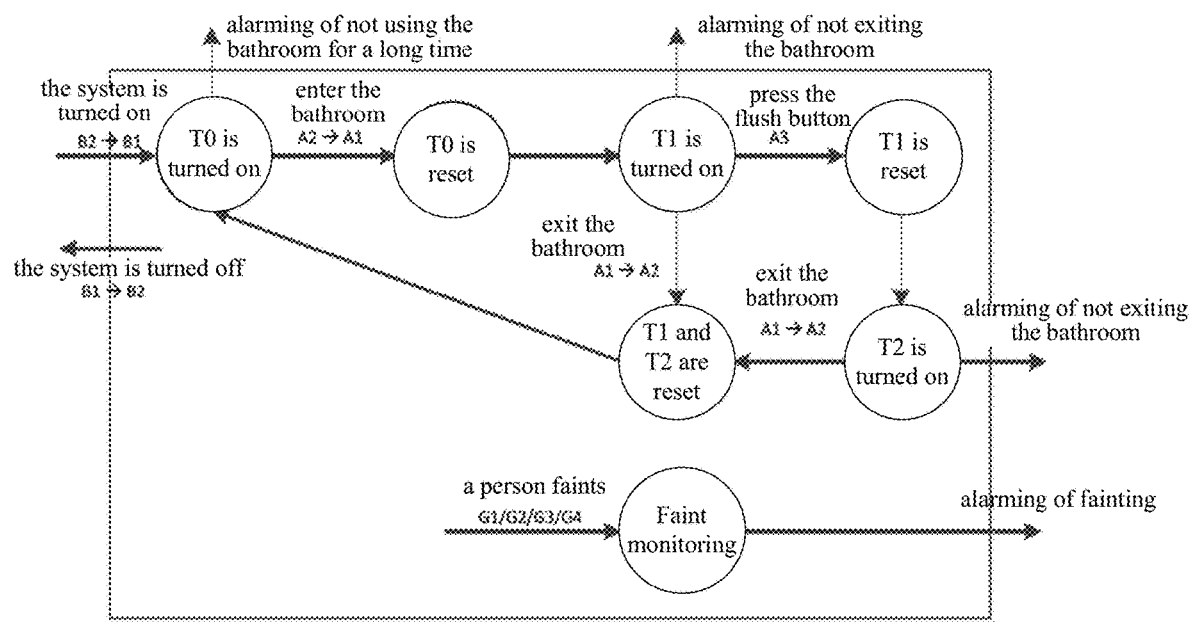
FIG. 3 is a flowchart of a monitoring method according to an exemplary embodiment of the present disclosure.

FIG. 3 is a flowchart of a monitoring method according to an exemplary embodiment of the present disclosure.

The monitoring system and the corresponding monitoring method will be described in further detail below with reference to FIG. 3.

First, when it is detected that the infrared sensors B1 and B2 are consecutively triggered, it can be known that a person is out of the house, and in order to save energy while preventing an erroneous alarm when the person is not at home, the monitoring system may suspend the monitoring. That is, when the information acquisition module detects that the infrared sensors B1 and B2 are consecutively triggered, the sensors other than the infrared sensors B1 and B2 are turned off, for example, the infrared sensors A1 and A2, the pressure sensors G1 to G4, and the key switch A3 are turned off. Conversely, when the infrared sensor B2 and B1 are detected to be consecutively triggered, it is known that a person has entered through the door, and the monitoring system can turn on the monitoring, that is, when the information acquisition device detects that the infrared sensors B2 and B1 are consecutively triggered, all the sensing devices are turned on.

The first timer T0 starts counting when the monitoring system starts operating, and if when the value of the first timer T0 is greater than or equal to the first threshold, the infrared sensors A2 and A1 are have not been consecutively triggered, the first alarm signal is generated; if the infrared sensors A2 and A1 are consecutively triggered before the first timer T0 is timed to the first threshold, the first timer T0 is reset and the second timer T1 is turned on; if when the value of the second timer T1 is greater than or equal to the second threshold, the key switch A3 has not been triggered and the infrared switches A1, A2 have not been consecutively triggered, the second alarm signal is generated; if the key switch A3 is triggered before the second threshold T1 is timed to the second threshold, the second timer T1 is reset and the third timer T2 is turned on; if when the value of the third timer T2 is greater than or equal to the third threshold, the infrared sensors A1 and A2 have not been consecutively triggered, the second alarm signal is issued; if the infrared sensors A1 and A2 are consecutively triggered before the third timer T2 is timed to the third threshold, the third timer T2 is reset and the first timer T0 is turned on; and if the infrared sensors A1 and A2 are consecutively triggered before the second timer T1 is timed to the second threshold, the second timer T1 is reset, and the first timer T0 is turned on. It is worth noting that the first, second, and third timers described above are used for timing purposes and can be integrated either in the information acquisition module or integrated in the central control module or be provided independently of the information acquisition module and the central control module. Further, the first, second, and third timers described above may be implemented as three separate timers, or may be implemented in one integrated timer.

In an exemplary embodiment, if one or more of the pressure sensors G1-G4 are detected to be triggered, a third alarm signal is generated.

It will be understood by those skilled in the art that the timer may be implemented by a counter for ease of implementation.

It is to be noted that the terms "first", "second" and the like used in the present disclosure are used only to distinguish different components, and not for specific limitation to the components. For example, in the present disclosure, the first data is data acquired by the first sensing devices (i.e., at least one pair of sensors disposed on the outside and inside of the bathroom door), for example, the first data being data on whether or not the bathroom is entered as detected by the first sensors. Similarly, the second data is data acquired by the second sensing device (e.g., a sensing device associated with a flush button of a toilet), for example, the second data being data on whether the flush button of the toilet is pressed as detected by the second sensing device; the third data is data acquired by the third sensing device, for example, the third data being data on whether the person fainted to the ground as detected by the third sensing devices (i.e., at least one sensing devices disposed on the ground of the bathroom and scattered around the toilet. the fourth data is data acquired by the fourth sensing devices (i.e., at least one pair of sensors disposed on the outside and inside of the home door), for example, the fourth data being data on whether the home door is entered or exited through as detected by the fourth sensing devices.

In summary, according to the monitoring system and the monitoring method of exemplary embodiments of the present disclosure, the use of the bathroom is mainly monitored to determine the health status of an old person living alone, thereby generating a corresponding alarm and turning the video monitoring only when an alarm is generated, thus satisfactorily protecting the privacy of the old person.

The foregoing is intended to be merely illustrative of the present disclosure, but the scope of the present disclosure is not limited thereto and it will be apparent to those skilled in the art that changes or substitutions that may be readily conceived within the scope of the disclosure disclosed should be covered within the scope of the present disclosure. Accordingly, the scope of protection of the present disclosure should be based on the scope of protection of the claims.

The invention claimed is:

1. A monitoring system, comprising:
   at least one pair of first sensing devices configurable to be disposed on an outside and inside of a room door;
   at least one pair of fourth sensing devices configurable to be disposed on an outside and inside of a home door,
   an information acquisition module;
   a control module;
   an image processing module;
   an image capturing device; and
   an alarm module,
   wherein the information acquisition module is configured to control the first sensing devices to acquire first data, receive the first data from the first sensing devices, and transmit the first data to the control module,
   the control module is configured to determine whether to generate a first alarm signal and/or second alarm signal based on the acquired first data, and to transmit the generated first alarm signal and/or second alarm signal to the alarm module, and
   the image processing module is configured to, in response to receiving the first alarm signal and/or the second alarm signal from the control module, turn on the image capturing device to capture images, receive the images from the image capturing device, and transmit the images;
   wherein the information acquisition module is further configured to turn on the first sensing device when the fourth sensing devices disposed on the outside and inside of the home door are consecutively triggered; and turn of the first sensing device when the fourth sensing devices disposed on the inside and outside of the home door are consecutively triggered.

2. The monitoring system according to claim 1, wherein the control module is configured to:
   generate the first alarm signal when the first sensing devices disposed on the outside and inside of the room door are not consecutively triggered for a time period greater than or equal to a first threshold.

3. The monitoring system according to claim 1, wherein the control module is configured to:
   generate the second alarm signal when the first sensing devices disposed on the inside and outside of the room door are not consecutively triggered for a time period greater than or equal to a second threshold after the first sensing devices disposed on the outside and inside of the room door were consecutively triggered in a time period less than a first threshold.

4. The monitoring system according to claim 1, wherein the system further comprises a second sensing device, wherein the information acquisition module is configured to control the second sensing device to acquire second data, receive the second data and transmit the second data to the control module, and the control module is further configured to generate the second alarm signal based on the acquired second data, receive the second alarm signal and transmit the second alarm signal to the alarm module,
   wherein the control module is configured to:
   generate the second alarm signal when the first sensing devices disposed on the inside and outside of the room door are not consecutively triggered for a time period greater than or equal to a third threshold after the first sensing devices disposed on the outside and the inside of the room door were consecutively triggered in a time period less than a first threshold and the second sensing device was triggered.

5. The monitoring system according to claim 4, wherein the system further comprises a third sensing device, wherein the information acquisition module is configured to control the third sensing device to acquire third data and to transmit the acquired third data to the control module, and the control module is further configured to determine whether to generate a third alarm signal based on the acquired third data and to transmit the generated third alarm signal to the alarm module.

6. The monitoring system of claim 5, wherein the third sensing device is at least one pressure sensor disposed on a bathroom floor and scattered around a toilet.

7. The monitoring system according to claim 5, wherein the image processing module is configured to turn on the image capturing device and to transmit an image acquired by the image capturing device according to the third alarm signal received from the control module.

8. The monitoring system according to claim 5, wherein the alarm module is configured to transmit at least one of first alarm information, second alarm information, and third alarm information corresponding to the first alarm signal, the second alarm signal, and the third alarm signal respectively.

9. The monitoring system of claim 5, wherein the information acquisition module is further configured to determine whether or not to control the second sensing device and the third sensing device for data acquisition based on fourth data acquired by the fourth sensing devices.

10. The monitoring system according to claim 9, wherein the information acquisition module is configured to:
turn on the second sensing device, and the third sensing device when the fourth sensing devices disposed on the outside and inside of the home door are consecutively triggered; and
turn off the second sensing device, and the third sensing device when the fourth sensing devices disposed on the inside and outside of the home door are consecutively triggered.

11. The monitoring system according to claim 4, wherein the second sensing device is a key switch triggered by a flush button of a toilet.

12. The monitoring system according to claim 1, wherein the first sensing devices are infrared sensors.

13. A monitoring method, comprising:
generating a first alarm signal when first sensing devices disposed on an outside and inside of a room door are not consecutively triggered for a time period greater than or equal to a first threshold, and
in response to the first alarm signal, turning on an image capturing device to capture images, receiving the images from the image capturing device, and transmitting the images;
wherein the monitoring method further comprises:
turning on the first sensing device when fourth sensing devices disposed on the outside and inside of the home door are consecutively triggered; and
turning off the first sensing device when the fourth sensing devices disposed on the inside and outside of the home door are consecutively triggered.

14. The monitoring method according to claim 13, further comprising:
generating a second alarm signal when the first sensing devices disposed on the inside and outside of the room door are not consecutively triggered for a time period greater than or equal to a second threshold after the first sensing devices disposed on the outside and inside of the room door were consecutively triggered in a time period less than the first threshold.

15. The monitoring method according to claim 14, further comprising: generating a third alarm signal when a third sensing device is triggered, wherein the third sensing device is at least one pressure sensor disposed on a bathroom floor and scattered around a toilet.

16. The monitoring method according to claim 15, further comprising:
turning on the first sensing device, the second sensing device, and the third sensing device when fourth sensing devices disposed on an outside and inside of a home door are consecutively triggered; and
turning off the first sensing device, the second sensing device, and the third sensing device when fourth sensing devices disposed on an inside and outside of a home door are consecutively triggered.

17. The monitoring method according to claim 13, further comprising:
generating a second alarm signal when the first sensing devices disposed on the inside and outside of the room door are not consecutively triggered for a time period greater than or equal to a third threshold after the first sensing devices disposed outside of the room door and disposed inside of the room door were consecutively triggered in a time period less than the first threshold and a second sensing device was triggered.

18. A monitoring system for monitoring use of a bathroom in a house to determine a health status of a person, the system comprising:
at least one pair of first sensing devices, wherein one of the pair of first sensing devices is disposed outside of a door of the bathroom and the other one of the pair of the first sensing devices is disposed inside of the door of the bathroom, wherein the at least one pair of first sensing devices are configured to detect that the person enters the bathroom when the first sensing devices disposed on the outside and the inside of the door of the bathroom are consecutively triggered, and detect that the person leaves the bathroom when the first sensing devices disposed on the inside and outside of the door of the bathroom are consecutively triggered;
at least one pair of fourth sensing devices, wherein one of the pair of fourth sensing devices is disposed outside of a home door of the house and the other one of the pair of the fourth sensing devices is disposed inside of the home door, wherein the at least one pair of fourth sensing devices are configured to detect that the person enters the house when the fourth sensing devices disposed on the outside and inside of the home door are consecutively triggered, and detect that the person leaves the house when the fourth sensing devices disposed on the inside and outside of the home door are consecutively triggered;
an information acquisition module;
a control module;
an image processing module;
an image capturing device; and an alarm module,
wherein the information acquisition module is configured to control the first sensing devices to acquire first data, receive the first data and transmit the first data to the control module,
the control module is configured to generate a first alarm signal and/or second alarm signal based on the first data, and transmit the first alarm signal and/or the second alarm signal to the alarm module, and the image processing module is configured to, in response to receiving the first alarm signal and/or the second alarm signal from the control module, turn on the image capturing device to capture images, receive the images and transmit the images;

wherein the information acquisition module is further configured to turn on the first sensing device when the fourth sensing devices disposed on the outside and inside of the home door are consecutively triggered; and turn off the first sensing device when the fourth sensing devices disposed on the inside and outside of the home door are consecutively triggered.

19. The monitoring system according to claim 18, wherein the control module is configured to:

generate the first alarm signal to indicate that the person has not entered the bathroom for a time period, when the first sensing device disposed outside of the door and the first sensing device disposed inside of the door are not consecutively triggered for a time period greater than or equal to a first threshold, and generate the second alarm signal to indicate that the person has not left the bathroom for a time period after the person entered the bathroom, when the first sensing device disposed inside of the door and the first sensing device disposed outside of the door are not consecutively triggered for a time period greater than or equal to a second threshold, after the first sensing device disposed outside of the door and the first sensing device disposed inside of the door were consecutively triggered in a time period less than the first threshold.

20. The monitoring system according to claim 18, wherein the monitoring system further comprises:

a second sensing device configured to be triggered by a flush button of a toilet in the bathroom to acquire second data, wherein the second alarm signal is generated based on the second data; and a plurality of third sensing devices disposed on a floor of the bathroom to detect that the person has fainted on the ground, wherein the control module is configured to generate a third alarm signal when the third sensing devices are triggered, and the image capturing device is turned on according to the third alarm signal;

wherein the second sensing device and the third sensing devices are turned on by the information acquisition module when the fourth sensing device disposed outside of the home door and the fourth sensing device disposed inside of the home door are consecutively triggered, and the second sensing device; and the third sensing devices are turned off by the information acquisition module when the fourth sensing device disposed inside of the home door and the fourth sensing device disposed outside of the home door are consecutively triggered.

* * * * *

UNITED STATES PATENT AND TRADEMARK OFFICE
CERTIFICATE OF CORRECTION

PATENT NO. : 10,847,008 B2
APPLICATION NO. : 15/525790
DATED : November 24, 2020
INVENTOR(S) : Lihua Geng et al.

Page 1 of 1

It is certified that error appears in the above-identified patent and that said Letters Patent is hereby corrected as shown below:

In the Claims

Column 8, Line 35, replace "turn of" with --turn off--

Signed and Sealed this
Nineteenth Day of January, 2021

Andrei Iancu
*Director of the United States Patent and Trademark Office*